United States Patent
Beier et al.

(10) Patent No.: US 9,988,938 B2
(45) Date of Patent: Jun. 5, 2018

(54) JET ENGINE COMPRISING A DEVICE FOR SPRAYING OIL

(71) Applicant: Rolls-Royce Deutschland Ltd & Co KG, Blankenfelde-Mahlow (DE)

(72) Inventors: Juergen Beier, Schulzendorf (DE); Gideon Venter, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 507 days.

(21) Appl. No.: 14/532,819

(22) Filed: Nov. 4, 2014

(65) Prior Publication Data

US 2015/0135663 A1   May 21, 2015

(30) Foreign Application Priority Data

Nov. 19, 2013   (DE) .................. 10 2013 112 771

(51) Int. Cl.
| | |
|---|---|
| F01D 25/18 | (2006.01) |
| F01M 1/10 | (2006.01) |
| B01D 47/06 | (2006.01) |
| F02C 3/30 | (2006.01) |
| F02C 7/06 | (2006.01) |
| B01D 45/14 | (2006.01) |

(52) U.S. Cl.
CPC .............. F01D 25/18 (2013.01); B01D 45/14 (2013.01); B01D 47/06 (2013.01); F02C 3/30 (2013.01); F02C 7/06 (2013.01); F05D 2210/13 (2013.01); F05D 2260/609 (2013.01); F05D 2260/98 (2013.01)

(58) Field of Classification Search
CPC ............ F01M 2013/0422; F01M 13/04; F01D 25/18; B04B 5/005; B01D 45/14
USPC ................................. 184/6.11, 6.24
See application file for complete search history.

(56) References Cited

U.S. PATENT DOCUMENTS

| | | | | |
|---|---|---|---|---|
| 1,811,157 | A * | 6/1931 | Schwerdtfeger | ........ B04B 5/005 184/6.24 |
| 4,511,016 | A * | 4/1985 | Doell | ...................... F01D 25/20 184/6.11 |
| 4,714,139 | A * | 12/1987 | Lorenz | ............... B01D 19/0031 184/6.11 |

(Continued)

FOREIGN PATENT DOCUMENTS

| | | |
|---|---|---|
| DE | 69605014 | 5/2000 |
| EP | 2260184 | 12/2010 |

(Continued)

OTHER PUBLICATIONS

German Search Report dated Mar. 19, 2014 from counterpart app No. 10 2013 112 771.1.

(Continued)

*Primary Examiner* — Henry Y Liu
(74) *Attorney, Agent, or Firm* — Shuttleworth & Ingersoll, PLC; Timothy J. Klima

(57) ABSTRACT

The present invention describes a jet engine with a device for spraying oil into an air-oil volume flow guided inside a flow cross-section limited by a wall area. The air-oil volume flow is guidable through an oil separator in order to separate the oil. In accordance with the invention, the oil can be sprayed into the air-oil volume flow in the area of the device via an outlet area rigidly connected to the wall area.

15 Claims, 7 Drawing Sheets

(56) References Cited

U.S. PATENT DOCUMENTS

Figure 2:
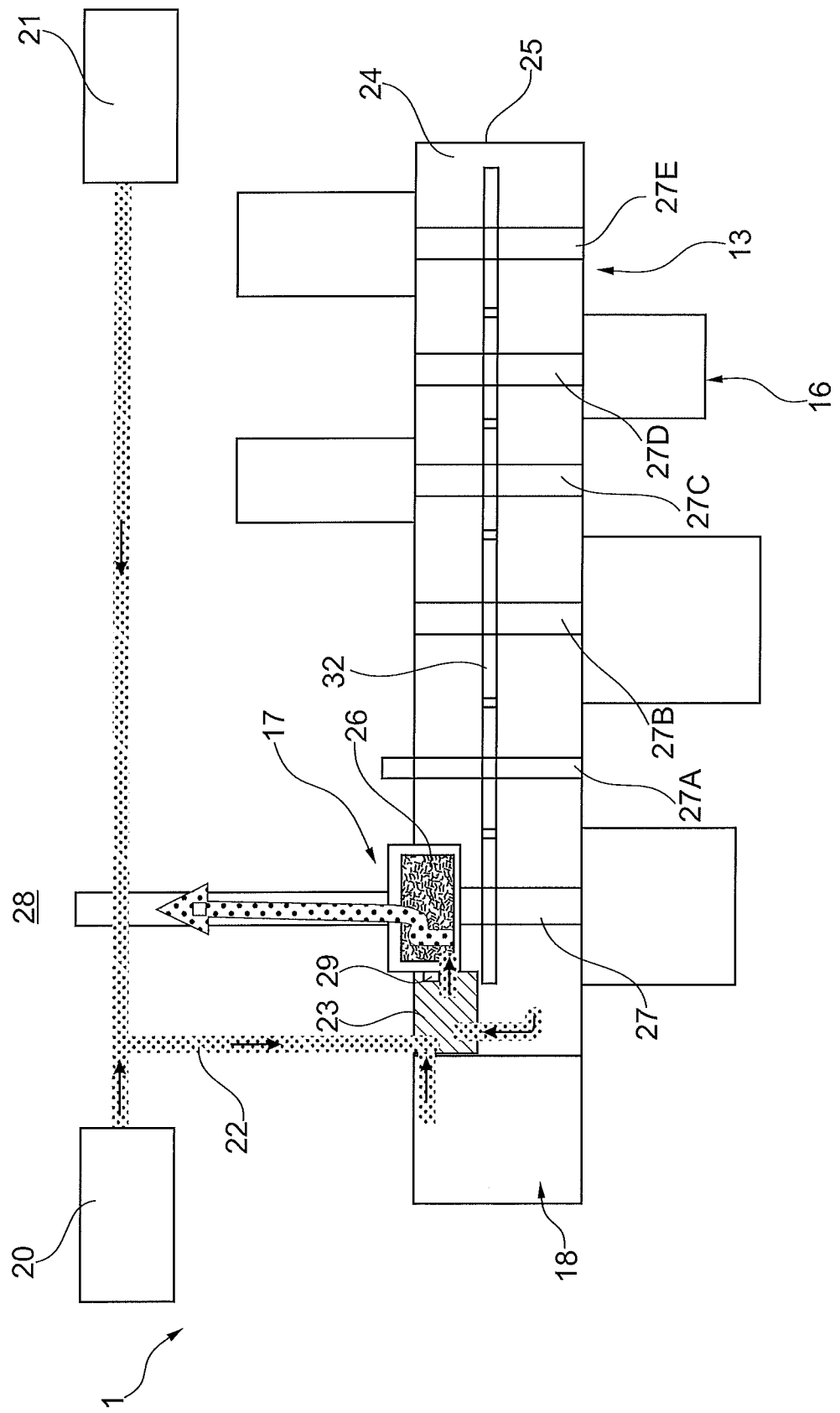

| | | | | |
|---|---|---|---|---|
| 4,755,103 | A * | 7/1988 | Streifinger | F16N 39/06 184/6.11 |
| 5,242,033 | A * | 9/1993 | Toraason | F16H 57/0412 184/6.12 |
| 5,575,912 | A * | 11/1996 | Herman | B04B 1/08 184/6.24 |
| 5,637,217 | A * | 6/1997 | Herman | B04B 1/08 184/6.24 |
| 5,716,423 | A * | 2/1998 | Krul | B01D 45/14 55/485 |
| 5,776,229 | A | 7/1998 | Blanes et al. | |
| 6,540,653 | B2 * | 4/2003 | Herman | B04B 1/04 184/6.24 |
| 6,551,230 | B2 * | 4/2003 | Herman | B04B 1/04 184/6.24 |
| 6,602,180 | B2 * | 8/2003 | Herman | B04B 1/04 184/6.24 |
| 6,652,439 | B2 * | 11/2003 | Herman | B04B 1/04 184/6.24 |
| 6,705,349 | B2 * | 3/2004 | Themudo | F01M 13/0405 138/89 |
| 6,858,056 | B2 * | 2/2005 | Kwan | B01D 45/14 55/400 |
| 7,063,734 | B2 * | 6/2006 | Latulipe | B01D 50/002 55/337 |
| 7,367,427 | B2 * | 5/2008 | Gaines | F01D 25/18 184/6.11 |
| 7,455,150 | B1 * | 11/2008 | Gekht | F01D 25/16 184/11.2 |
| 7,566,356 | B2 * | 7/2009 | Latulipe | B01D 50/002 184/6.24 |
| 7,935,164 | B2 * | 5/2011 | Fang | B01D 45/14 55/385.3 |
| 7,993,425 | B2 * | 8/2011 | Corattiyil | B01D 45/14 138/89 |
| 8,292,034 | B2 * | 10/2012 | Mount | F01D 25/18 138/89 |
| 8,443,843 | B2 * | 5/2013 | Mount | F01D 25/18 138/89 |
| 8,794,222 | B2 * | 8/2014 | Schwandt | F01M 13/04 123/196 A |
| 8,807,097 | B2 * | 8/2014 | Schwandt | F01M 13/04 123/41.86 |
| 8,893,689 | B2 * | 11/2014 | Dawar | F02M 25/06 123/196 A |
| 9,464,572 | B2 * | 10/2016 | Cutrara | F02C 7/06 |
| 2003/0010572 | A1 * | 1/2003 | Henry | F16C 33/6662 184/5.1 |
| 2005/0211093 | A1 * | 9/2005 | Latulipe | B01D 50/002 95/270 |
| 2009/0133581 | A1 * | 5/2009 | Fang | B01D 45/14 96/216 |
| 2009/0134243 | A1 * | 5/2009 | Mount | F01D 25/18 239/265.27 |
| 2009/0183950 | A1 * | 7/2009 | Brouillet | F01D 25/20 184/6.24 |
| 2010/0307167 | A1 | 12/2010 | Morreale | |
| 2015/0136096 | A1 * | 5/2015 | Shioda | F01M 13/04 123/568.14 |

FOREIGN PATENT DOCUMENTS

| | | |
|---|---|---|
| EP | 2657463 A1 | 10/2013 |
| FR | 2952402 | 5/2011 |
| WO | 2009/122057 | 10/2009 |
| WO | WO2013168232 A1 | 11/2013 |

OTHER PUBLICATIONS

European Search Report dated May 16, 2015 for related Application No. 14190222.1.

* cited by examiner

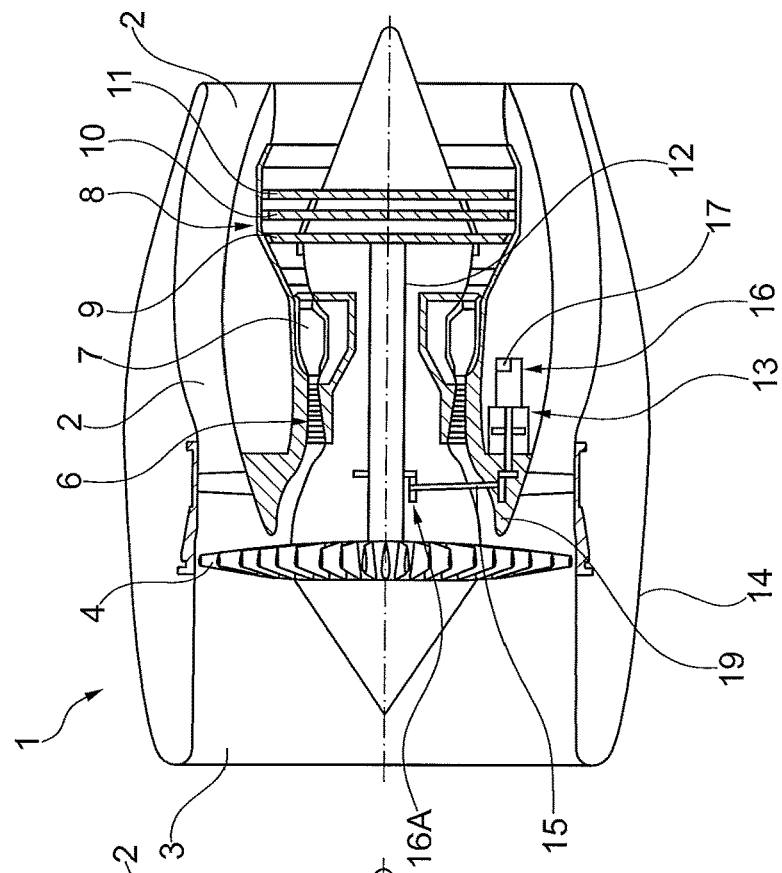
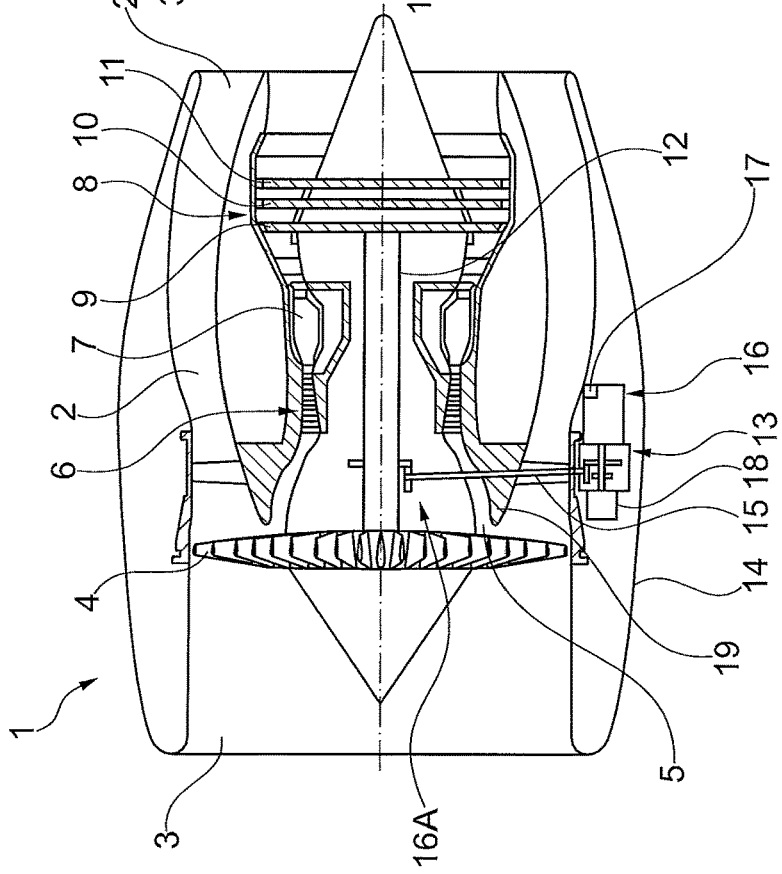

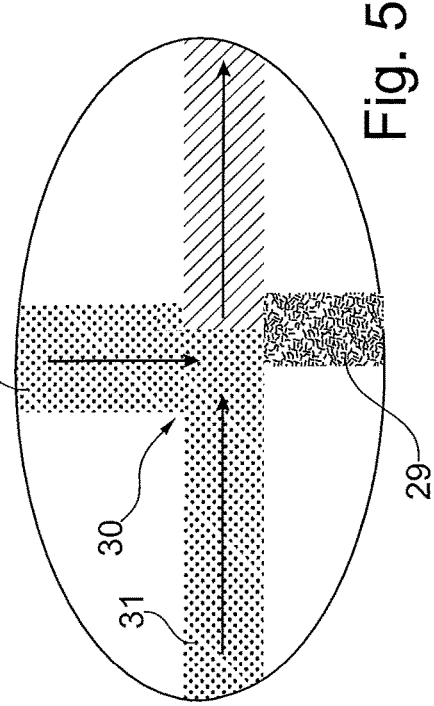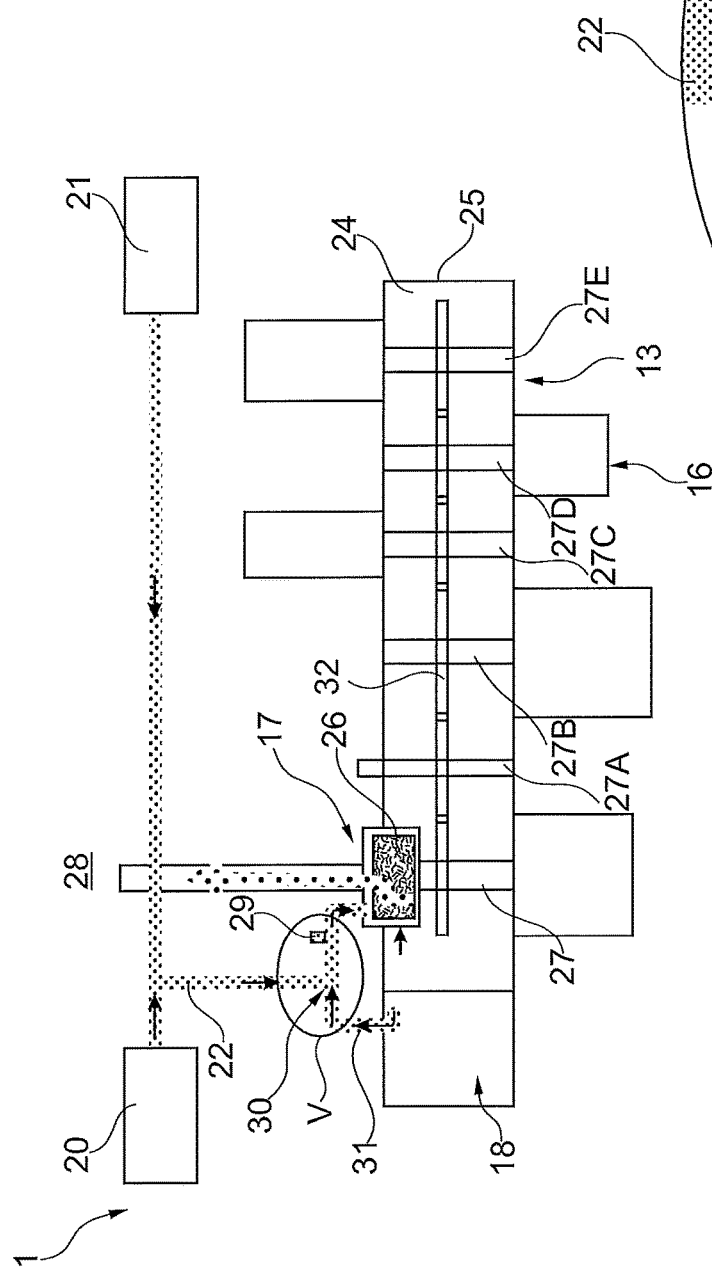

JET ENGINE COMPRISING A DEVICE FOR SPRAYING OIL

This application claims priority to German Patent Application DE102013112771.1 filed Nov. 19, 2013, the entirety of which is incorporated by reference herein.

This invention relates to a jet engine with a device for spraying in oil.

From the unpublished specification DE 10 2013 106 879.0 of the applicant, a jet engine with at least one oil separator is known, through which an air-oil volume flow can be guided out of at least one area supplied with oil for separating the oil. The jet engine is provided with a device for spraying oil into the air-oil volume flow. A defined oil spray jet is preferably directly introduced into the air-oil volume flow using the device. When sprayed-in oil droplets meet oil droplets already present in the air-oil volume flow, the sprayed-in oil droplets and the already present oil droplets combine to form larger drops, which is desirable, due to their forces of attraction, said drops being mechanically separable from the air in the further flow path of the air-oil volume flow with less effort than oil particles of smaller diameter. The device is designed with an oil nozzle, said oil nozzle being configured such that during spraying of oil into the air-oil volume flow flowing in the direction of the oil separator, oil drops are generated which are mostly larger than those oil drops that cannot be filtered out in a porous area of the oil separator due to their size.

The object underlying the present invention is to provide a jet engine with a device for spraying in oil that is simply designed and can be implemented into existing engine systems with low effort.

It is a particular object to provide a solution to the above problems by a jet engine having features described herein.

The jet engine in accordance with the invention is provided with a device for spraying oil into an air-oil volume flow guided inside a flow cross-section limited by a wall area, said air-oil volume flow being guidable through an oil separator in order to separate the oil.

The oil can be sprayed into the air-oil volume flow in the area of the device by a simply designed method via an outlet area rigidly connected to the wall area, so that existing jet engine systems too can be designed with little effort with a device for spraying in oil.

In an embodiment of particularly simple design of the jet engine in accordance with the invention, the outlet area includes a hole passing through the wall area substantially in the radial direction.

If the oil sprayable out of the outlet area into the air-oil volume flow can be imparted with a flow direction in the outlet area, said flow direction forming an acute angle, i.e. an angle ranging from 0° to 90°, and/or an obtuse angle, i.e. an angle ranging from 90° to 180°, with the main flow direction of the air-oil volume flow in the area of the device, a degree of distribution of the oil sprayed into the air-oil volume flow can be set in a simple and defined way, and the introduction process can be adapted to a preferred flow velocity of the air-oil volume flow.

If the outlet area includes several holes at a distance from one another and arranged spread over the preferably circular-designed flow cross-section, said holes issuing into the flow cross-section and being connected, on the side facing away from that side of the wall area limiting the flow cross-section, to a feed area encompassing the wall area on the circumferential side, then the air-oil volume flow can be obtained at little effort with a distribution of the oil sprayed into the air-oil volume flow that is favourable for increasing a separation capacity in the area of an oil separator arranged downstream.

In a likewise simply designed embodiment of the jet engine in accordance with the invention, the holes are connected to one another via an annular groove.

If the outlet area has at least one element projecting in the radial direction from the wall area into the flow cross-section of the air-oil volume flow and containing an oil guide duct, the oil can be sprayed into the air-oil volume flow in an area of the flow cross-section at a distance from the wall with a required degree of distribution.

If the oil guide duct of the projecting element issues into a further oil guide duct of the element, running substantially in the flow direction of the air-oil volume flow and via which the oil can be guided out of the element into the air-oil volume flow, then the oil can be diverted, regardless of the flow velocity of the air-oil volume flow, in and/or against the flow direction of the air-oil volume flow before it is sprayed into the air-oil volume flow. This permits in simple manner a defined spraying angle of the oil into the air-oil volume flow and for example allows the generation inside the air-oil volume flow of an at least approximately conical oil spray mist, by which a high degree of distribution of the oil inside the air-oil volume flow can be achieved.

For setting a required degree of distribution of the oil in the air-oil volume flow, one each nozzle device of the outlet area can be provided in the opening area of the end of the further oil guide duct or in the opening area of both ends of the further oil guide duct, by means of which the oil can be supplied to the air-oil volume flow with a defined droplet diameter and, if necessary, turned into mist.

If the outlet area includes several elements arranged over the preferably circular-designed flow cross-section and projecting into the flow cross-section which are connected, on the side facing away from that side of the wall area limiting the flow cross-section, to a feed area encompassing the wall area on the circumferential side, the oil can be sprayed into the air-oil volume flow preferably in a radially outer area of the flow cross-section in the zone of several outlet areas and can be introduced with a high degree of distribution into the air-oil volume flow.

In a simply designed embodiment of the jet engine favourable in terms of installation space, the projecting elements are connected to one another via an annular groove of the feed area.

The separation capacity in the area of an oil separator can, in a development of the jet engine in accordance with the invention, be improved by the device of the jet engine having in the flow direction of the air-oil volume flow several areas for spraying in oil at a distance from one another, since droplet diameters of oil borne along in the air-oil volume flow can be adjusted or enlarged to the required extent via several oil entry points arranged one behind the other in the flow direction.

Both the features stated in the patent Claims and the features stated in the following exemplary embodiments of the jet engine in accordance with the invention are each suitable, singly or in any combination with one another, to develop the subject matter of the invention. The respective feature combinations do not represent any restriction with regard to the development of the subject matter in accordance with the invention, but have substantially only exemplary character.

Further advantages and advantageous embodiments of the jet engine in accordance with the invention become apparent from the patent Claims and the exemplary embodiments described in principle in the following with reference to the accompanying drawing, where in the description of the various exemplary embodiments the same reference numerals are used for components of identical design and function for greater clarity.

Figure 3:
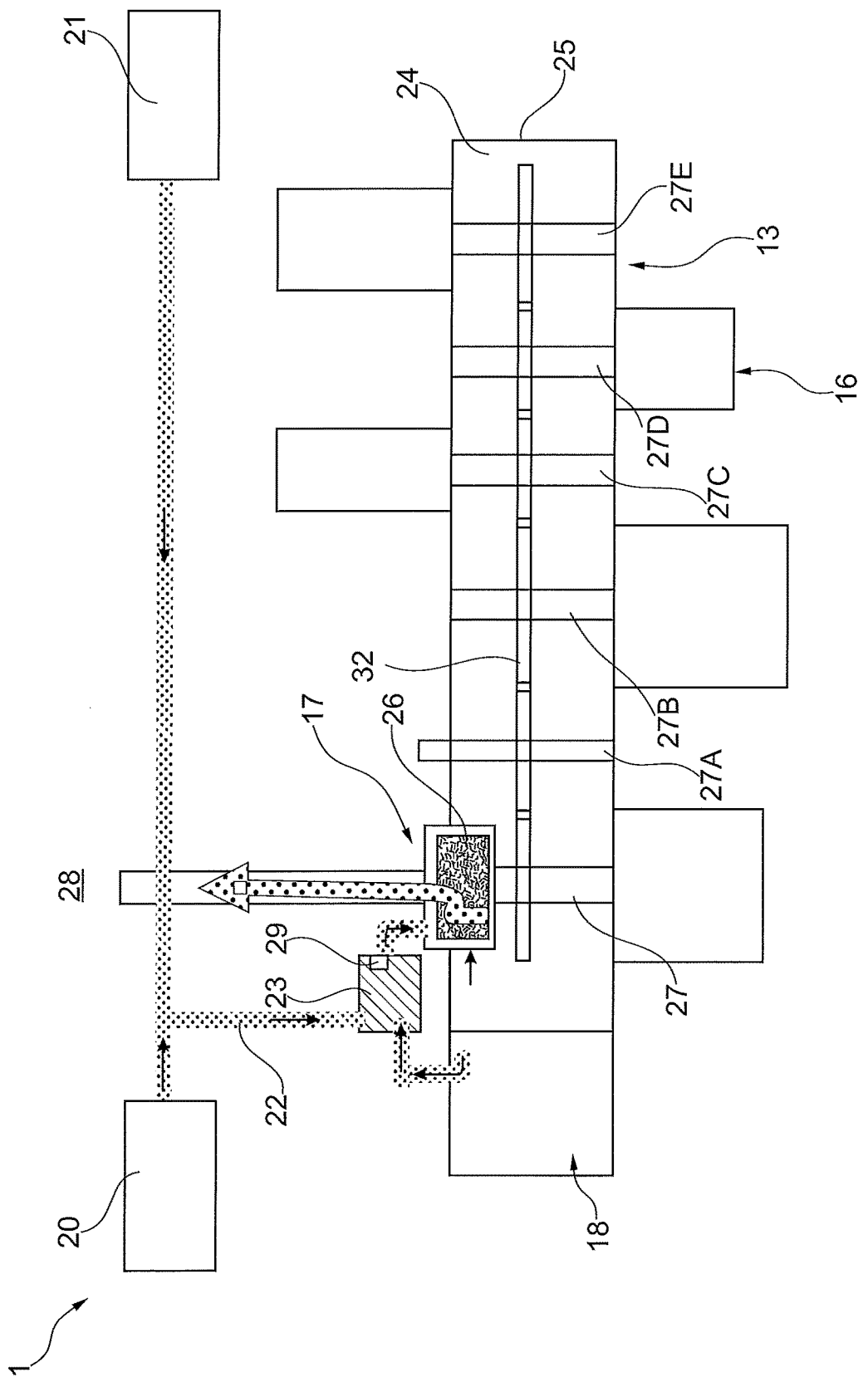
Figure 6:
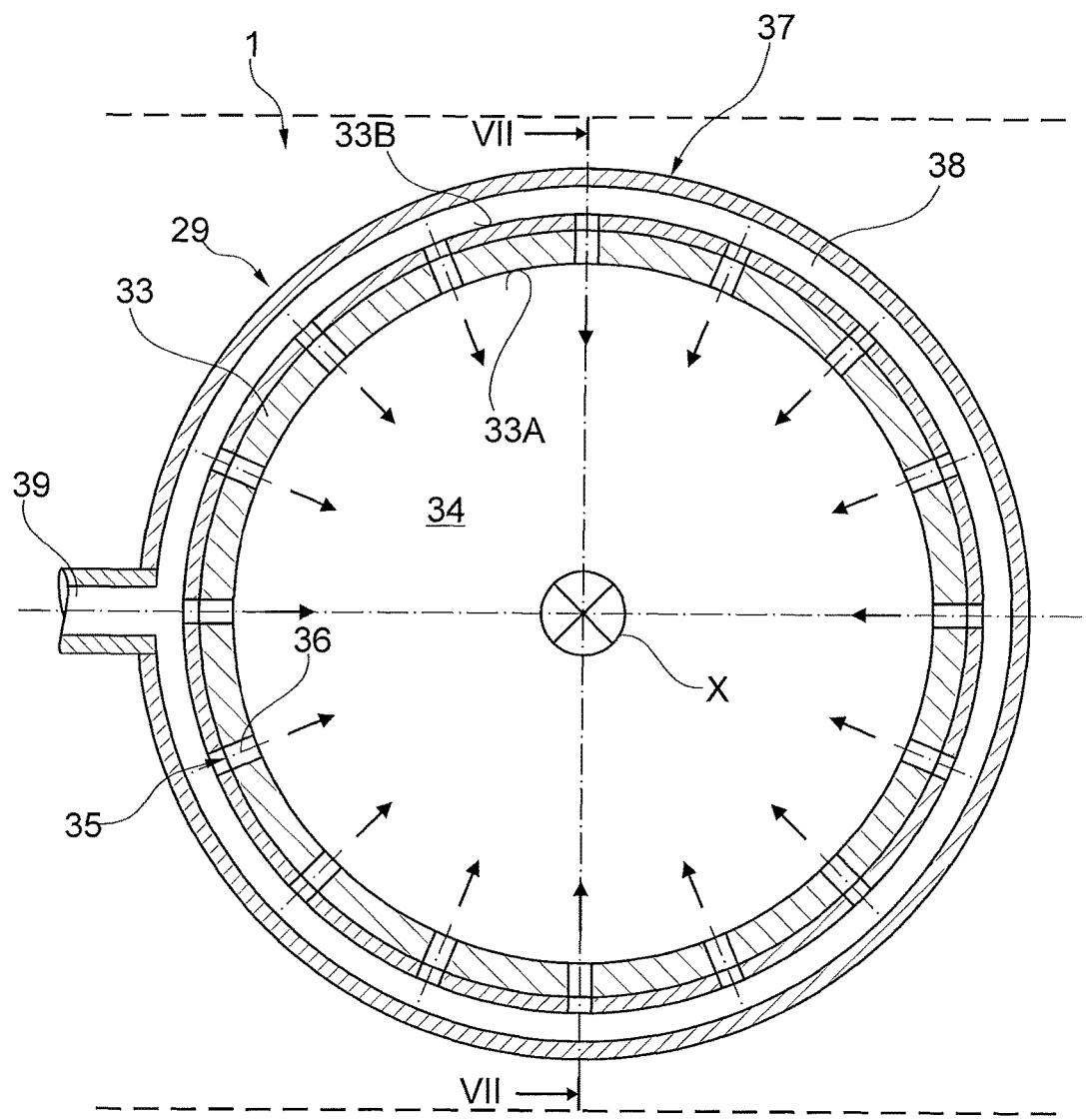
Figure 7:
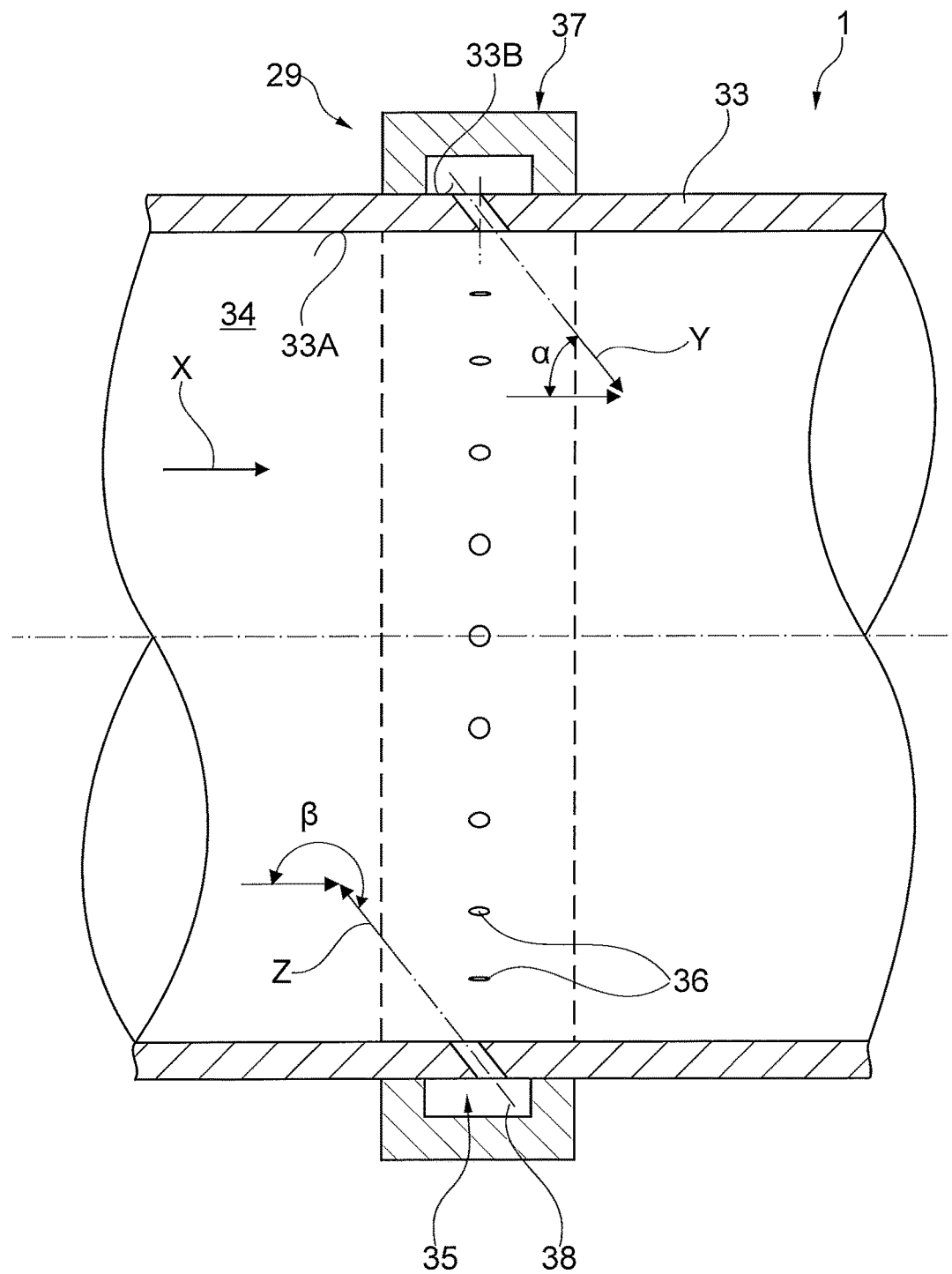
Figure 8:
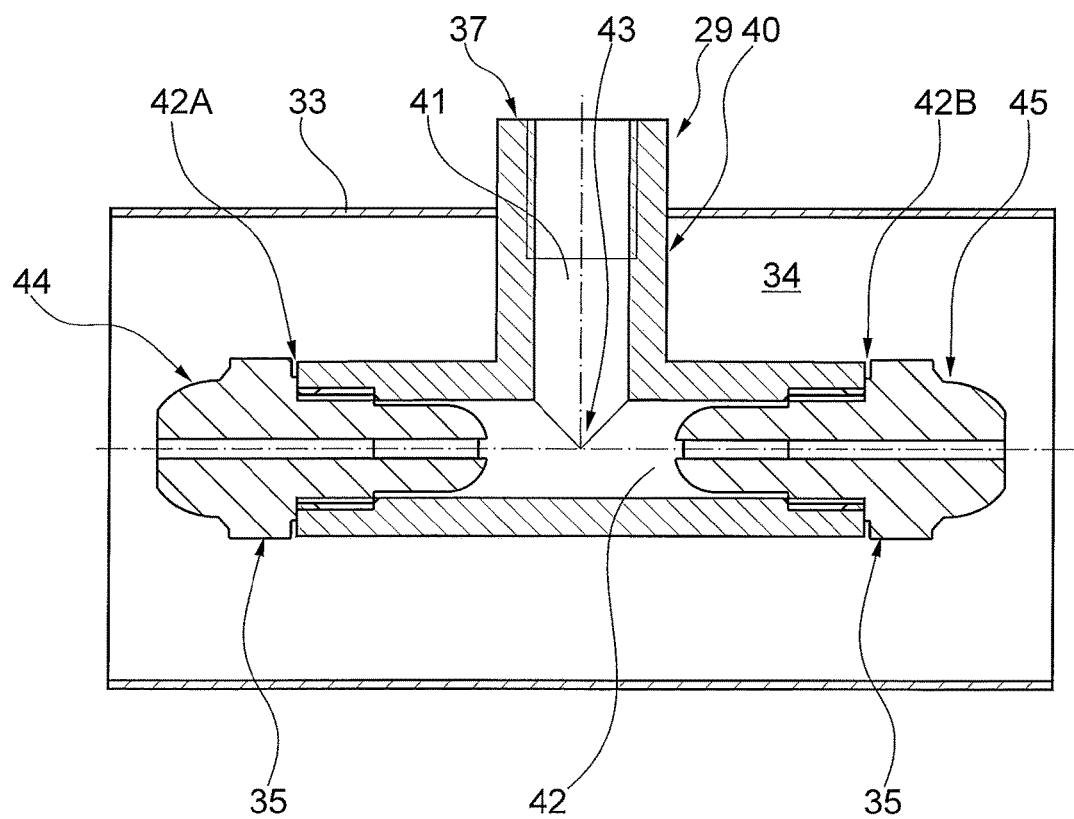

In the drawing,

FIG. 1a shows a highly schematized longitudinal sectional view of a jet engine with an accessory gearbox arranged in the fan casing, FIG. 1b shows a representation—corresponding to FIG. 1a—of a jet engine with an accessory gearbox mounted in the area of the engine core, FIG. 2 shows a highly schematized partial representation of the jet engine according to FIG. 1a or FIG. 1b with an oil separator arranged in the area of the accessory gearbox, and associated pre-chamber provided in a casing of the accessory gearbox, FIG. 3 shows a representation—corresponding to FIG. 2—of an embodiment—departing from FIG. 2—of the jet engine according to FIG. 1a or FIG. 1b with a pre-chamber arranged outside a casing of the accessory gearbox, FIG. 4 shows a highly schematized partial representation of the jet engine according to FIG. 1a or FIG. 1b with a device for spraying oil into an air-oil volume flow arranged upstream of the oil separator, FIG. 5 shows an enlarged representation of an area V shown in more detail in FIG. 4, FIG. 6 shows a detailed cross-sectional view of a first embodiment of the device for spraying oil into an air-oil volume flow, FIG. 7 shows a longitudinal sectional view of the device for spraying in oil in accordance with FIG. 4 along the sectional plane VII-VII, and FIG. 8 shows a longitudinal sectional view of a second embodiment of the device for spraying oil into an air-oil volume flow.

FIGS. 1a and 1b each show a jet engine 1 in a longitudinal sectional view. The jet engine 1 is provided with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7 and a turbine device 8.

The turbine device 8 has in the present invention three rotor devices 9, 10 and 11, which have a substantially comparable design and are connected to an engine axis 12.

In the design of the jet engine 1 according to FIG. 1a, an accessory gearbox 13 is arranged in an outer engine casing 14, delimiting the bypass duct 2 and representing the outer circumferential area of the jet engine 1. The accessory gearbox 13 in the present invention is connected via a drive shaft 15 running in the radial direction of the jet engine 1 and via an inner gearbox 16A to the engine axis 12 and is thus driven/subjected to torque by the engine axis 12 during operation of the jet engine 1. Various auxiliary units 16 and an oil separator 17, which is also referred to as breather, are subjected to torque to the required extent by the accessory gearbox 13. Additionally, an oil tank 18 is provided in the area of the accessory gearbox 13, which represents a hydraulic fluid reservoir, from which oil is tapped for cooling and lubricating various areas of the jet engine 1 such as bearing devices, gear pairings of the inner gearbox 16A and of the accessory gearbox 13, and further assemblies of the jet engine 1 that are to be cooled and lubricated.

In contrast to this, the accessory gearbox 13 with the auxiliary units 16 and the oil separator 17 is arranged, in the design of the jet engine 1 according to FIG. 1b, in the radial direction between the bypass duct 2 and the engine core 5 in a component 19 delimiting both the bypass duct 2 and the engine core 5.

FIG. 2 to FIG. 4 show three different embodiments of the jet engine 1 according to FIG. 1a in a highly schematized form in the area of the accessory gearbox 13, the auxiliary units 16 and the oil separator 17, the latter being in the present invention in operative connection to the oil tank 18 and two further areas 20, 21 designed here as bearing chambers of the jet engine 1 and supplied during operation of the jet engine 1 with oil from the oil tank 18 for lubrication and cooling. The area 20 here represents the bearing chamber of the front bearing and the area 21 the bearing chamber of the rear bearing of the jet engine 1. The jet engine 1 according to FIG. 1b shows the aspects described in more detail with reference to FIG. 2 to FIG. 4 to a substantially identical extent.

In the embodiment of the jet engine 1 shown in FIG. 2, air-oil volume flows from the front bearing chamber 20 and from the rear bearing chamber 21 can each be guided in the direction of a line section 22, which in the present invention issues into a pre-chamber 23 upstream of the oil separator 17. Furthermore, the oil tank 18 too in the present invention is connected to the pre-chamber 23, to allow introduction of an air-oil volume flow from the oil tank 18 and of the air-oil volume flows from the bearing chambers 20 and 21 tangentially into the pre-chamber 23 via the line section 22. Furthermore an interior 24 of a casing 25 of the accessory gearbox 13 is linked to the pre-chamber 23, where an air-oil volume flow from the casing 25 of the accessory gearbox 13 is introduced tangentially into the pre-chamber 23 when appropriate pressure is applied to the interior 24. The pre-chamber 23 is connected to the oil separator 17, in the interior of which a porous area 26 is rotatably arranged that can be passed by the air-oil volume flow flowing out of the pre-chamber 23.

It is possible here for the pre-chamber 23 to be designed as a tube or tube section provided with a widened internal diameter and acting as the line which carries the air-oil volume flow.

The porous area 26 can in the present invention be driven by the accessory gearbox 13 via a gear 27 and acts as a centrifuge in order to reduce as far as possible the proportion of oil in the air-oil volume flow flowing through the porous area 26. The proportion of oil of the air-oil volume flow in the oil separator 17 is here reduced in the zone of the porous area 26 by separation of the oil from the air, on the one hand as when flowing through an impingement filter and on the other hand as in the area of a centrifuge, due to the rotation of the porous area 26. The oil filtered out of the air-oil volume flow in the zone of the porous area 26 is extracted in the outer area of the oil separator 17, in a manner not shown in detail, via a pump device and returned to the oil tank 18. The air flowing out of the oil separator 17 in the direction of the environment 28 has only a low oil load.

The gear 27 is, in addition to further gears 27A to 27E, non-rotatably connected to a gear shaft 32 and arranged in the interior 24 of the accessory gearbox 13.

To enable the oil load of the air volume flow flowing-off in the direction of the environment 28 to be set as low as possible, in the present invention a device 29 is provided in the area of the transition between the pre-chamber 23 and the oil separator 17, by means of which oil is sprayed into the air-oil volume flow flowing from the pre-chamber 23 in the direction of the oil separator 17 with a defined droplet size. To do so, the device 29 is designed such that during spraying of oil into the air-oil volume flow flowing in the direction of the oil separator 17, oil drops are generated which are mostly larger than those oil drops that cannot be filtered out in the porous area 26 due to their small size.

Also upstream of the device 29, a deflection area is provided in the area of the pre-chamber 23 for the air-oil volume flows passed out of the interior 24 and out of the oil tank 18 into the pre-chamber 23 via the line section 22, in which deflection area at least part of the oil is separated from the air-oil volume flows of the bearing chambers 20 and 21, the interior 24 and the oil tank 18 by the centrifugal force acting in the deflection area. As a result, the oil load of the air-oil volume flow is already reduced in the deflection area of the pre-chamber 23 by filtering out larger droplets, which have a greater inertia than oil particles with smaller diameters.

Subsequently, the smaller droplets still present in the air-oil volume flow flowing out in the direction of the oil separator 17 from the pre-chamber 23 are enlarged by spraying in oil via the device 29, which is favoured by the forces of attraction prevailing in each case between the individual oil droplets. If the air-oil volume flow enriched with oil flows through the oil separator 17 and its porous area 26, which rotates accordingly during operation of the jet engine 1, a further substantial proportion of the oil present in the air-oil volume flow is hurled outwards and then extracted from the oil separator 17 in the direction of the oil tank 18. The oil particles now enlarged by washing out the oil can be separated from the metal foam 26 in the breather 17 substantially more efficiently, by spraying in oil, so that oil losses of the jet engine 1 in the direction of the environment 28 are minimized by the reduced emissions.

Alternatively to the above description, it is also possible that by means of the device 29 arranged upstream of the deflection area of the pre-chamber 23, acting as a centrifuge, in the area of the bearing chambers and/or in the area of exhaust air suction points, oil is introduced into one or several air-oil volume flows in the jet engine 1, and that the larger drops forming in the air-oil volume flow downstream of the device 29 due to the combination of the oil droplets are separated in the deflection area of the pre-chamber 23 due to the effect of the centrifugal force. The further separation process previously described then takes place in the rotating porous area 26 of the oil separator 17, before the air flowing out of the oil separator 17 is discharged in the direction of the environment 28 with only a small load of oil.

It is furthermore also possible that oil is already introduced into one or more air-oil volume flows via the device 29 in the bearing chambers or in the interior of further consumers of sealing air, such as the inner gearbox of the jet engine 1, and that the larger drops forming in the air-oil volume flow downstream of the device 29 due to the combination of the oil droplets are separated in the deflection area of the pre-chamber 23 due to the effect of the centrifugal force. The further separation process previously described then takes place in the rotating porous area 26 of the oil separator 17, before the air flowing out of the oil separator 17 is discharged in the direction of the environment 28 with only a small load of oil.

With the design according to FIG. 2, the pre-chamber 23 is completely integrated into the casing 25 of the accessory gearbox 13, while the oil separator 17 engages at least in some areas in the interior 24 of the accessory gearbox 13.

In contrast to this, the pre-chamber 23 in the design of the jet engine 1 according to FIG. 3 is arranged completely outside the casing of the accessory gearbox 13, while the oil separator 17 is arranged, to the same extent as in the design of the jet engine 1 according to FIG. 2, inside the casing 25 in some areas. As in the design of the jet engine 1 according to FIG. 2, in the jet engine 1 according to FIG. 3 too, the air-oil volume flows out of the bearing chambers 20 and 21, the oil tank 18 and the interior 24 of the accessory gearbox 13 are initially introduced tangentially into the pre-chamber 23 and passed on via the deflection area in the direction of the device 29, in the area of which oil is again sprayed into the collected air-oil volume flow. Then the oil-enriched air-oil volume flow is introduced into the oil separator 17 and flows there through the porous area 26.

The jet engine 1 according to FIG. 4 is, in contrast to this, designed without the pre-chamber 23 and can be used for—among other things—a jet engine, the oil tank of which is not integrated into the accessory gearbox 13 and is preferably arranged inside an installation space at a distance from the accessory gearbox 13 inside the jet engine. The oil-enriched air-oil volume flows in the area of the bearing chambers 20 and 21 and in the area of the oil tank 18 are introduced—downstream of a line section node 30, into the area of which the line section 22 and a further line section 31 connected to the oil tank 18 discharge—into the deflection area, in which part of the oil from the combined air-oil volume flow is separated. Again downstream of the deflection device, oil is sprayed by the device 29 into the air-oil volume flow flowing off from the line section node 30, as shown in highly schematic form in FIG. 5. The washed air-oil volume flow flows with larger oil drops into the oil separator 17, in which the oil is separated in the zone of the rotating porous area 26 in the manner previously described. In addition, the air-oil volume flow from the interior 24 of the accessory gearbox 13 is introduced tangentially and directly into the oil separator 17, in order to clean to the required extent the consumed air loaded with oil and flowing out of the pressurized casing 25 in the area of the oil separator 17.

FIG. 6 shows a cross-sectional view of a first embodiment of the device 29 for spraying oil into the air-oil volume flow, which is guided inside a flow cross-section 34 limited by a wall area 33, of the bearing chambers 20 and 21, of the oil tank 18 and preferably also of an air-oil volume flow from the interior 24 of the accessory gearbox 13. The device 29 according to FIG. 6 is designed with an outlet area 35 including several holes 36 passing through the wall area 33 substantially in the radial direction. The holes 36 are at a distance from one another and arranged spread substantially evenly in the circumferential direction of the flow cross-section 34 which is designed circular in the present invention, said holes issuing into the flow cross-section 34. On the side 33B facing away from that side 33A of the wall area 33 limiting the flow cross-section 34, the holes 36 are connected to a feed area 37 encompassing the wall area 33 on the circumferential side, said holes being connected to one another via an annular groove 38 of the feed area 37 shown in cross-section in FIG. 7 and supplyable with oil via a central feed line 39.

Alternatively to the substantially radial alignment of the holes 36 in the wall area 33, it can also be provided that the holes 36 shown in FIG. 7 and each running obliquely through the wall area 33 connect the annular groove 38 to the flow cross-section 34. The inclined course of the holes 36 in the wall area 33 relative to a flow direction X of the air-oil volume flow provides in simple manner the possibility of imparting a flow direction Y or Z to the oil inside the outlet area 35 and sprayable out of said outlet area 35 into the air-oil volume flow, said flow direction forming with the main flow direction X of the air-oil volume flow in the area of the device 29 an acute angle α or an obtuse angle β. In the present invention, the angle α can have angle values ranging from 0° to 90° and the angle β angle values ranging from 90° to 180°, depending on the application in question.

The selection of the flow direction imparted to the oil in the zone of the outlet area 35, which with a substantially radial course of the holes 36 in the wall area 33 is substantially perpendicular to the main flow direction X of the air-oil volume flow, is made depending on the application in question, in order to achieve the best possible degree of distribution of the oil in the air-oil volume flow downstream of the device 29.

A longitudinal sectional view of a second exemplary embodiment of the device 29 is shown in FIG. 8, where a feed area 37 connected to the outlet area has an element 40 projecting in the radial direction from the wall area 33 into the flow cross-section 34 of the air-oil volume flow, inside which element runs an oil guide duct 41.

The oil guide duct 41 of the projecting element 40 issues into a further oil guide duct 42 of the element 40 extending substantially in the flow direction X of the air-oil volume flow, via which duct oil can be guided out of the element 40 having the outlet area 35 into the air-oil volume flow. The further oil guide duct 42 extends from the opening area of the oil guide duct 41 against the flow direction X, and in the flow direction X of the air-oil volume flow in the projecting element 40. Additionally, the further oil guide duct 42 forms the outlet area 35 in the area of both ends 42A and 42B and issues there into the flow cross-section 34 of the air-oil volume flow.

In the opening area of both ends 42A and 42B of the further oil guide duct 42, a nozzle device 44, 45 of the outlet area 35 is provided in each case, by means of which the oil to be supplied can be introduced into the air-oil volume flow to the extent necessary for a high separation capacity in the area of the oil separator 17 with a defined droplet size, preferably as an oil mist.

Alternatively to this, there is also the possibility that the further oil guide duct 42 extends, in a manner not shown in detail, from the opening area 43 of the oil guide duct 41 only in the flow direction X or against the flow direction X of the air-oil volume flow in the flow cross-section 34 of the air-oil volume flow, and that oil can be introduced from the further oil guide duct 42 into the air-oil volume flow only in the area of the end 42B or only in the area of the end 42A. With a design of this type, the further oil guide duct 42 is designed without the end 42A or without the end 42B, or the end 42A or the end 42B is sealed using a dummy plug or the like.

Again depending on the application in question, the device 29 of the jet engine 1 is designed with only one area according to FIG. 6 and/or according to FIG. 8, or with several areas according to FIG. 6 and/or according to FIG. 8 that are at a distance from one another in the flow direction X of the air-oil volume flow for spraying oil into one or more air-oil volume flows, in order to achieve a high separation capacity, as required, in the area of the oil separator 17.

Additionally, it can also be provided that the feed area 37 of the device 29 according to FIG. 8 includes several elements 40 arranged over the preferably circular-designed flow cross-section 34 of the air-oil volume flow and projecting into the flow cross-section 34, said elements being connected, on the side 33B facing away from that side 33A of the wall area limiting the flow cross-section 34, to a zone of the feed area 37 encompassing the wall area 33 on the circumferential side, for example in the manner described in connection with FIG. 6 and FIG. 7, and being supplied with oil from said feed area 37.

LIST OF REFERENCE NUMERALS

1 Jet engine
2 Bypass duct
3 Intake area
4 Fan
5 Engine core
6 Compressor device
7 Burner
8 Turbine device
9, 10, 11 Rotor device
12 Engine axis
13 Accessory gearbox
14 Engine casing
15 Drive shaft
16 Auxiliary units
16A Inner gearbox
17 Oil separator
18 Oil tank
19 Component
20 Area, front bearing chamber
21 Area, rear bearing chamber
22 Line section
23 Pre-chamber
24 Interior
25 Casing
26 Porous area
27 Gear
27A to 27E Gear
28 Environment
29 Device
30 Line section node
31 Further line section
32 Gear shaft
33 Wall area
33A, 33B Side of wall area
34 Flow cross-section
35 Outlet area
36 Hole
37 Feed area
38 Annular groove
39 Central feed line
40 Element
41 Oil guide duct
42 Further oil guide duct
42A, 42B End of further oil guide duct
43 Opening area of oil guide duct
44, 45 Nozzle device
X Main flow direction of air-oil volume flow
Y, Z Flow direction imparted to the oil
α Acute angle
β Obtuse angle

The invention claimed is:

1. A jet engine, comprising
a wall area forming a flow cross-section;
an outlet area rigidly connected to the wall area;
a spraying device for injecting a spray of oil into an air-oil volume flow guided inside the flow cross-section;
a separate oil supply separate from the air-oil volume flow for supplying oil to the spraying device;
an oil separator;
the air-oil volume flow being guided through the oil separator to separate the oil from the air-oil volume, the spraying device being positioned to infect the spray of oil from the separate oil supply into the air-oil volume flow in an area of the spraying device via the outlet area.

2. The jet engine in accordance with claim 1, wherein the outlet area includes a hole passing through the wall area substantially in a radial direction.

3. The jet engine in accordance with claim 1, wherein the oil injectable out of the outlet area into the air-oil volume flow is imparted with a flow direction in the outlet area, the flow direction forming an acute angle with a main flow direction of the air-oil volume flow in the area of the spraying device.

4. The jet engine in accordance with claim 2, wherein the spraying device includes a feed area connected to the separate oil supply and circumferentially encompassing the wall area and the outlet area includes a plurality of holes positioned around a circumference of the flow cross-section, the plurality of holes issuing into the flow cross-section and being connected, on a side facing away from a side of the wall area limiting the flow cross-section, to the feed area.

5. The jet engine in accordance with claim 4, wherein the feed area includes an annular groove and the plurality of holes are connected to one another via the annular groove of the feed area.

6. The jet engine in accordance with claim 1, wherein the spraying device includes a feed area connected to the separate oil supply and to the outlet area and the feed area includes a projecting element projecting in a radial direction from the wall area into the flow cross-section of the air-oil volume flow, and the projecting element includes an oil guide duct running in a substantially radial direction and connecting the feed area with the outlet area.

7. The jet engine in accordance with claim 6, wherein the projecting element includes a further oil guide duct connecting the oil guide duct with the outlet area, the further oil guide duct running substantially in a main flow direction of the air-oil volume flow and via which the oil can be guided out of the outlet area into the air-oil volume flow.

8. The jet engine in accordance with claim 7, wherein the projecting element includes one end or two ends positioned in the air-oil volume flow and the further oil guide duct extends in the projecting element from an opening area of the oil guide duct in a direction of at least one chosen from against the flow direction of the air-oil volume flow and in the flow direction of the air-oil volume flow and forms the outlet area in an area of the one end or in areas of the two ends and issues there into the flow cross-section of the air-oil volume flow.

9. The jet engine in accordance with claim 8, and further comprising a nozzle device for spraying the oil positioned in the outlet area of the one end or in each of the two ends.

10. The jet engine in accordance with claim 6, wherein the feed area includes a plurality of elements arranged around a circumference of the flow cross-section and projecting into the flow cross-section which are connected, on a side of the wall area facing away from the flow cross-section, to a zone of the feed area encompassing the wall area.

11. The jet engine in accordance with claim 10, wherein the feed area includes an annular groove connecting the projecting elements to one another.

12. The jet engine in accordance with claim 1, wherein the spraying device includes in a flow direction of the air-oil volume flow, a plurality of areas for injecting in oil sprays spaced at a distance from one another.

13. The jet engine in accordance with claim 1, wherein the oil injectable out of the outlet area into the air-oil volume flow is imparted with a flow direction in the outlet area, the flow direction forming an obtuse angle with a main flow direction of the air-oil volume flow in the area of the spraying device.

14. The jet engine in accordance with claim 4, wherein the wall area is ring-shaped in cross-section and forms a circular flow cross-section.

15. The jet engine in accordance with claim 14, wherein the feed area includes an annular groove and the plurality of holes are connected to one another via the annular groove of the feed area.

* * * * *